(12) United States Patent
Zlotnick et al.

(10) Patent No.: US 7,523,275 B2
(45) Date of Patent: Apr. 21, 2009

(54) METHOD, SYSTEM, AND PROGRAM FOR MAINTAINING A COPY RELATIONSHIP BETWEEN PRIMARY VOLUMES AND CORRESPONDING SECONDARY VOLUMES

(75) Inventors: Aviad Zlotnick, Mitzpeh Netofah (IL); Shachar Fienblit, Ein Ayala (IL); Olympia Gluck, Haifa (IL); Michael E. Factor, Haifa (IL); William Frank Micka, Tucson, AZ (US); Gail Andrea Spear, Tucson, AZ (US); Joseph Smith Hyde, II, Tucson, AZ (US); Martin Jacob Tross, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 564 days.

(21) Appl. No.: 10/410,757

(22) Filed: Apr. 10, 2003

(65) Prior Publication Data

US 2004/0205312 A1 Oct. 14, 2004

(51) Int. Cl.
*G06F 12/00* (2006.01)

(52) U.S. Cl. .................. 711/162; 711/154; 711/161
(58) Field of Classification Search .................. 711/162
See application file for complete search history.

(56) References Cited

U.S. PATENT DOCUMENTS 5,530,871 A 6/1996 Abe
5,592,685 A 1/1997 Pawlowski
5,623,599 A 4/1997 Shomler
5,913,215 A * 6/1999 Rubinstein et al. ............ 707/10
6,098,122 A 8/2000 Emmes et al.
6,173,377 B1 * 1/2001 Yanai et al. .................. 711/162
6,237,008 B1 5/2001 Beal et al.
6,496,908 B1 * 12/2002 Kamvysselis et al. ........ 711/162
6,684,306 B1 * 1/2004 Nagasawa et al. ........... 711/162

FOREIGN PATENT DOCUMENTS

JP 3282756 12/1991
JP 4273323 9/1992

OTHER PUBLICATIONS

Iyer, Sitaram and Druschel, Peter. "Anticipatory scheduling: A disk scheduling framework to overcome deceptive idleness in synchronous I/O." Aug. 24, 2001. as accessed at <http://www.cs.rice.edu/~ssiyer/r/antsched/> on Dec. 4, 2008.*

* cited by examiner

*Primary Examiner*—Kevin L Ellis
*Assistant Examiner*—Matthew Bradley
(74) *Attorney, Agent, or Firm*—David W. Victor; Konrad Raynes & Victor LLP

(57) ABSTRACT

Provided are a method, system, and program for accessing a resource. Requests are generated to access a resource in a first access mode and a second access mode. The requests are processed to access the resource in the second mode before processing at least one request to access the resource in the first access mode. The processing of the requests to access the resource in the first access mode is delayed for a time period after processing all the requests to access the resource in the second access mode in order to wait to receive a subsequent request to access the resource in the second access mode.

16 Claims, 4 Drawing Sheets

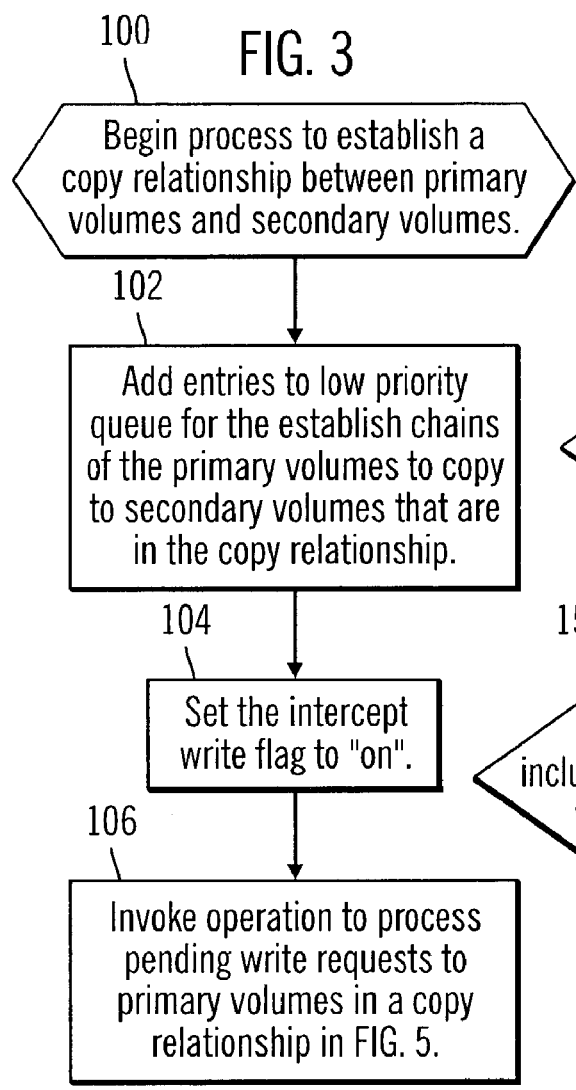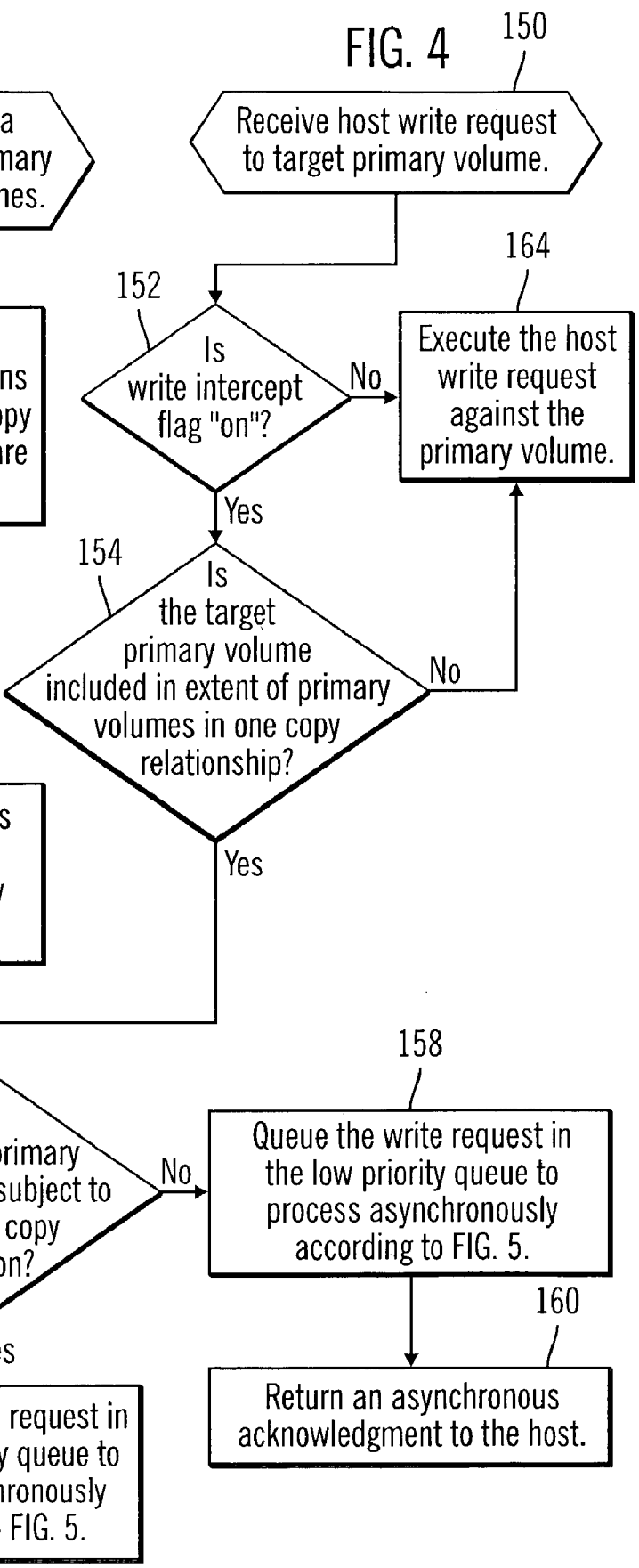

METHOD, SYSTEM, AND PROGRAM FOR MAINTAINING A COPY RELATIONSHIP BETWEEN PRIMARY VOLUMES AND CORRESPONDING SECONDARY VOLUMES

BACKGROUND OF THE INVENTION

1. Field of the Invention

The present invention relates to a method, system and program for maintaining a copy relationship between primary volumes and corresponding secondary volumes.

2. Description of the Related Art

Data storage systems may maintain a secondary copy of data at a remote site to use in the event of a failure at the primary site. Such dual or shadow copies are typically made as the application system is writing new data to a primary storage device. International Business Machines Corporation (IBM®), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary storage and a secondary storage controller may be provided to control access to the secondary storage.

In PPRC mirroring, when establishing a remote copy relationship between data sets in the primary volumes and secondary volumes, an initial copy of the primary volumes is written to the secondary volumes in the secondary DASD. Data sets from the primary volume are copied asynchronously during the initial copy, which means that the write acknowledgment is returned immediately to the host even before the data is physically copied to the secondary DASD over a dedicated cable or line. The initial copy operation sends the data sets in the PPRC relationship over the link in groups of data sets, referred to as establish chains.

In one mode of PPRC, any host writes to data sets in the primary volumes in the PPRC relationship while the initial copy operation is pending are intercepted. The initial copy logs the write operation and after completing the initial copy of a group of data sets, the logged writes are then transmitted over the line to the secondary site. If the initial copy operation has completed with respect to the data set of the intercepted write, then the data sets are copied synchronously to the corresponding secondary volume(s) in the secondary DASD, which means that acknowledgment of the write is not returned to the host initiating the write until the write completes at the secondary site, and acknowledgment is returned to the primary site to return to the host. Host operations may be delayed pending receipt of the synchronous acknowledgment.

The intercepted target data sets that are written synchronously to the secondary site have to share a link with the group of data being copied asynchronously, including both initial copy data and write requests that are handled asynchronously. This sharing of the link can cause further delays in processing the intercepted synchronous writes because the typically large size of asynchronous writes consumes a substantial amount of bandwidth, thereby causing delays in transmitting and processing the intercepted host writes being handled synchronously.

For these reasons, there is a need in the art to provide improved techniques for transferring data in primary volumes being mirrored at a remote site.

SUMMARY OF THE PREFERRED EMBODIMENTS

Provided are a method, system, and program for accessing a resource. Requests are generated to access a resource in a first access mode and a second access mode. The requests are processed to access the resource in the second mode before processing at least one request to access the resource in the first access mode. The processing of the requests to access the resource in the first access mode is delayed for a time period after processing all the requests to access the resource in the second access mode in order to wait to receive a subsequent request to access the resource in the second access mode.

Further provided are a method, system, and program for maintaining a copy relationship between at least one primary volume and at least one corresponding secondary volume, wherein data in the at least one primary volume in the copy relationship is copied to the corresponding at least one secondary volume in the copy relationship. Writes are generated comprising data in the at least one primary volume to copy to the corresponding at least one secondary volume in the copy relationship in a first write mode and writes are generated comprising write requests to the at least one primary volume in the copy relationship to copy to at least one corresponding secondary volume in a second write mode. A plurality of the writes are transferred to the at least one secondary volume in the second write mode before processing at least one write to the secondary volume in the first mode. The processing of writes to the at least one secondary volume in the first write mode is delayed for a time period after processing all the writes to the at least one secondary volume in the second write mode in order to wait to receive a subsequent write to one primary volume in the copy relationship in the second write mode.

In further implementations, the writes in the first write mode may include data being copied from the at least one primary volume in the copy relationship to the corresponding at least one secondary volume as part of an initial copy operation to copy all the data in the at least one primary volume in the copy relationship to the at least one corresponding secondary volume.

In yet further implementations, the writes in the first write mode may further include writes to the at least one primary volume received after initiating the initial copy operation.

Still further, the first write mode comprises an asynchronous write mode and the second write mode comprises a synchronous write mode.

Described implementations provide techniques for allowing certain types of requests, such as high priority requests, to be processed without being continually delayed by other types of write requests, such as lower priority requests that may consume substantial resources.

BRIEF DESCRIPTION OF THE DRAWINGS

Referring now to the drawings in which like reference numbers represent corresponding parts throughout:

FIGS. 3, 4, and 5 illustrates operations performed to handle write requests to primary volumes subject to a copy relationship with corresponding secondary volumes in accordance with implementations of the invention.

DETAILED DESCRIPTION OF THE PREFERRED EMBODIMENTS

In the following description, reference is made to the accompanying drawings which form a part hereof and which illustrate several implementations of the present invention. It is understood that other implementations may be utilized and structural and operational changes may be made without departing from the scope of the present invention.

Figure 1:
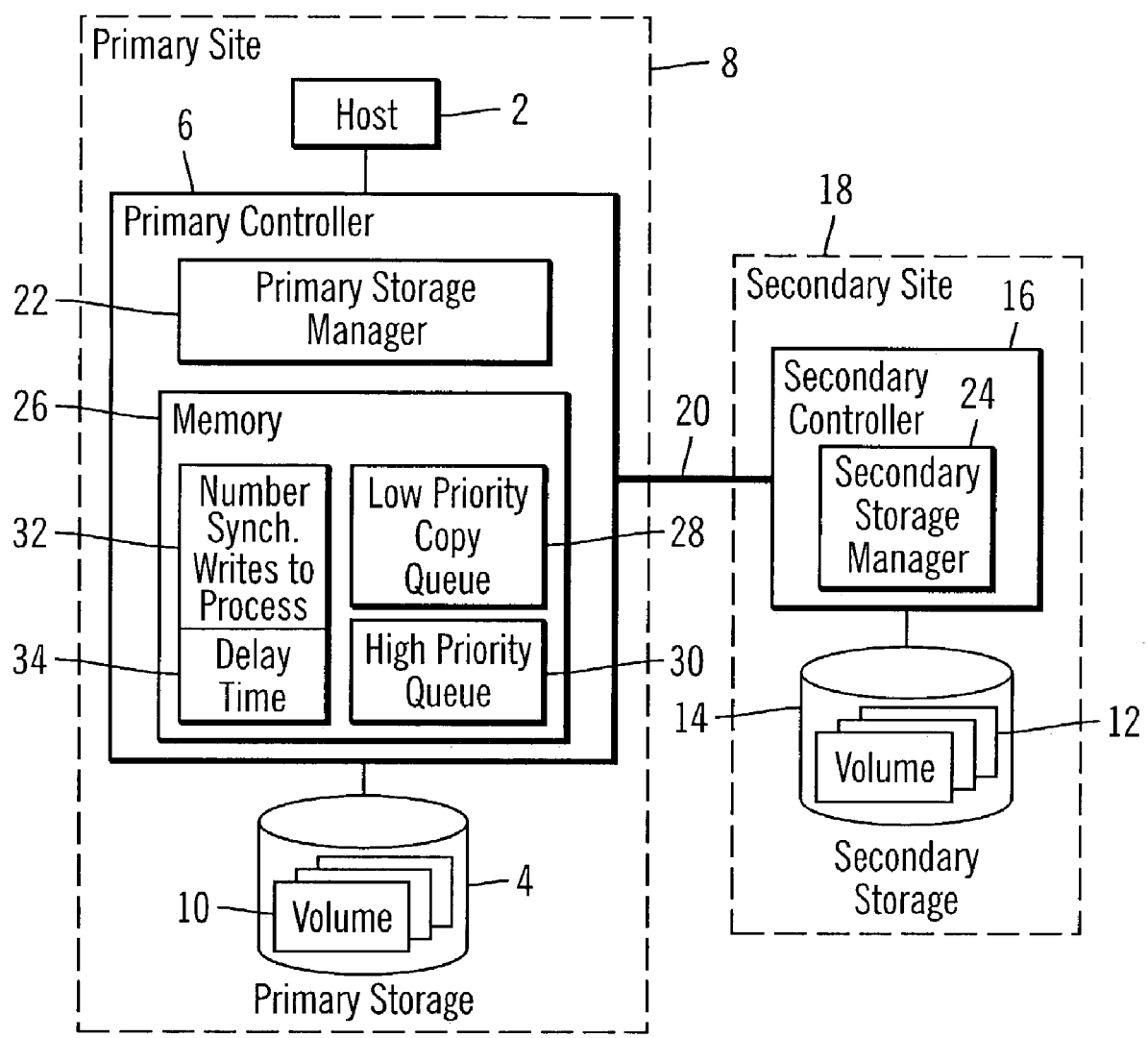
FIG. 1 illustrates a network computing environment in accordance with implementations of the invention.

FIG. 1 illustrates a network computing environment in which aspects of the invention are implemented. One or more hosts 2 (only one is shown) communicate Input/Output (I/O) requests to a primary storage 4 through a primary controller 6. The primary storage 4 and primary controller 6 are at a primary site 8. The hosts 2 may or may not be at the primary site 8. The primary storage 4 maintains data in one or more primary volumes 10, which may comprise logical volumes configured in the primary storage 4, such as logical unit numbers (LUNs), logical volumes, logical drives, etc. Certain of the volumes 10 in the primary storage 4 may be included in a copy relationship with corresponding secondary volumes 12 in a secondary storage 14. Data in one or more primary volumes 10 in the primary storage 4 subject to the copy relationship are transferred to the corresponding one or more secondary volumes 12 in secondary storage 14 via a secondary controller 16 at a secondary site 18 via a connection 20. The connection 20 may comprise one or more dedicated lines, such as fibre optical wires or may comprise a network connection, such as a Local Area Network (LAN), Storage Area Network (SAN), Wide Area Network (WAN), the Internet, an Intranet, etc. The secondary controller 16 stores host updates to the primary storage 4 in the secondary storage 14 that provides a mirror copy of the data at the primary storage 4.

A primary storage manager 22 performs data management operations at the primary controller 6 and a secondary storage manager 24 performs data management operations at the secondary controller 16.

The primary 6 and secondary 16 controllers may comprise any storage management system known in the art, such as a storage controller, server, enterprise storage server, etc. The primary 4 and secondary 14 storages may comprise any storage system known in the art, such as a Direct Access Storage Device (DASD), Just a Bunch of Disks (JBOD), a Redundant Array of Independent Disks (RAID), virtualization device, tape storage, optical disk storage, or any other storage system known in the art.

In certain implementations, the primary 8 and secondary 18 sites may be implemented in different power boundaries, such that the destruction or substantial failure at one site will not impact the data stored at the other sites. Further, the primary 8 and secondary 18 sites may be in different geographical locations, in a same building, but different floors or rooms, in different buildings in a same geographical locations, or separated by a distance.

The primary controller 6 further includes a memory 26, which may comprise any volatile or non-volatile memory or storage device known in the art, that maintains the following information, which may be maintained in any data structure format known in the art:

Low Priority Queue 28: used to queue host write requests to which an asynchronous acknowledgment was returned, which may include those host write requests to primary volumes that have not yet been copied during the initial copy operation and the primary volumes 10 being copied as part of the initial copy operation. In certain implementations, the initial copy operations involve the processing of establish chains, where each establish chain is a group of data sets comprising a portion of the one or more primary volumes 10 that must be copied to establish the copy relationship. For instance, if the copy relationship involves 100 tracks, there may be ten establish chains often volumes each, thus ten entries in the low priority queue 22. The low priority queue 28 may further include any host write requests handled asynchronously, like host write requests to primary volumes in a copy relationship that have not been copied to the corresponding secondary volumes as part of the initial copy operation. Further, host writes handled asynchronously may be grouped into large groups in order to accumulate an optimal amount of data for the transferring over the link 20 to secondary storage. Further, it is allowable to delay host write requests handled asynchronously because the host has already received acknowledgment and is not delayed by having to wait for a synchronous acknowledgment that the write request has been applied to the secondary volume 12 in secondary storage 14. The asynchronous host write requests may be placed in the low priority queue 28 such that they are processed following the establish chains of primary volumes 10 that are part of the initial copy operation.

High Priority Queue 30: used to queue host 2 write requests that are to be transmitted synchronously to the secondary controller 16 to store in the secondary storage 14. As discussed, host write requests directed to primary volumes that have already been copied over to the secondary storage as part of the initial copy operation are handled synchronously to ensure that the secondary copy is made. Such synchronously handled host write requests have higher priority in order to minimize delays in returning acknowledgment to the hosts 2.

Number of synchronous writes to process 32: a parameter that indicates a number of synchronous writes to process from the high priority queue 30 before processing an asynchronous write in the low priority queue 28.

Delay Time 34: If the high priority queue 30 becomes empty when processing synchronous host writes and the number of synchronous writes to process 32 has not been met, then the delay time 34 indicates the time the primary storage manager 24 waits for further synchronous host writes to arrive before switching to process the asynchronous writes in the low priority queue 28.

Figure 2:
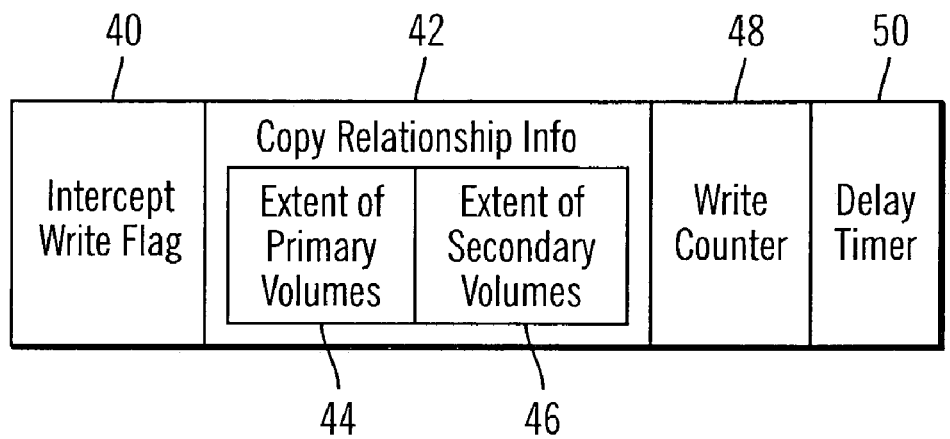
FIG. 2 illustrates information maintained to manage write requests to primary volumes in a copy relationship whose data is maintained at secondary volumes in accordance with implementations of the invention.

FIG. 2 illustrates further information the primary storage manager 18 maintains in memory 26 to maintain a copy relationship, such as a PPRC relationship. A write intercept flag 40 indicates whether primary volumes in the primary storage 4 may be subject to a copy relationship and need to be intercepted to transfer a copy to the secondary storage 14. An intercept write flag 40 may be maintained for each primary volume. The primary storage manager 18 further maintains copy relationship information 42 on an extent of primary volumes 44 and an extent of secondary volumes 46 that are subject to a copy relationship, such that a copy of the data at the specified primary volumes 10 indicated in the primary extent 44 is maintained in the specified secondary volumes 12 indicated in the secondary extent 46. If the primary storage manager 22 is maintaining multiple copy relationships, then there may be multiple instances of the copy relationship information 42. Further, volumes 10 in the primary storage 4 may comprise secondary volumes in a copy relationship with primary volumes maintained at a different storage. Similarly, volumes 12 in the secondary storage 14 may comprise primary volumes in a copy relationship with primary volumes maintained at a different storage. Additional information may be maintained with the copy relationship information 42.

The write counter 48 (FIG. 2) is a counter set to the number of synchronous writes to process 32 in the high priority queue 30 before processing the asynchronous writes in the low priority queue 28 and the delay timer 50 is a timer/counter set to the delay time 34. These counters 48 and 50 are used to manage the processing of writes in the queues 28 and 30.

Figure 5:
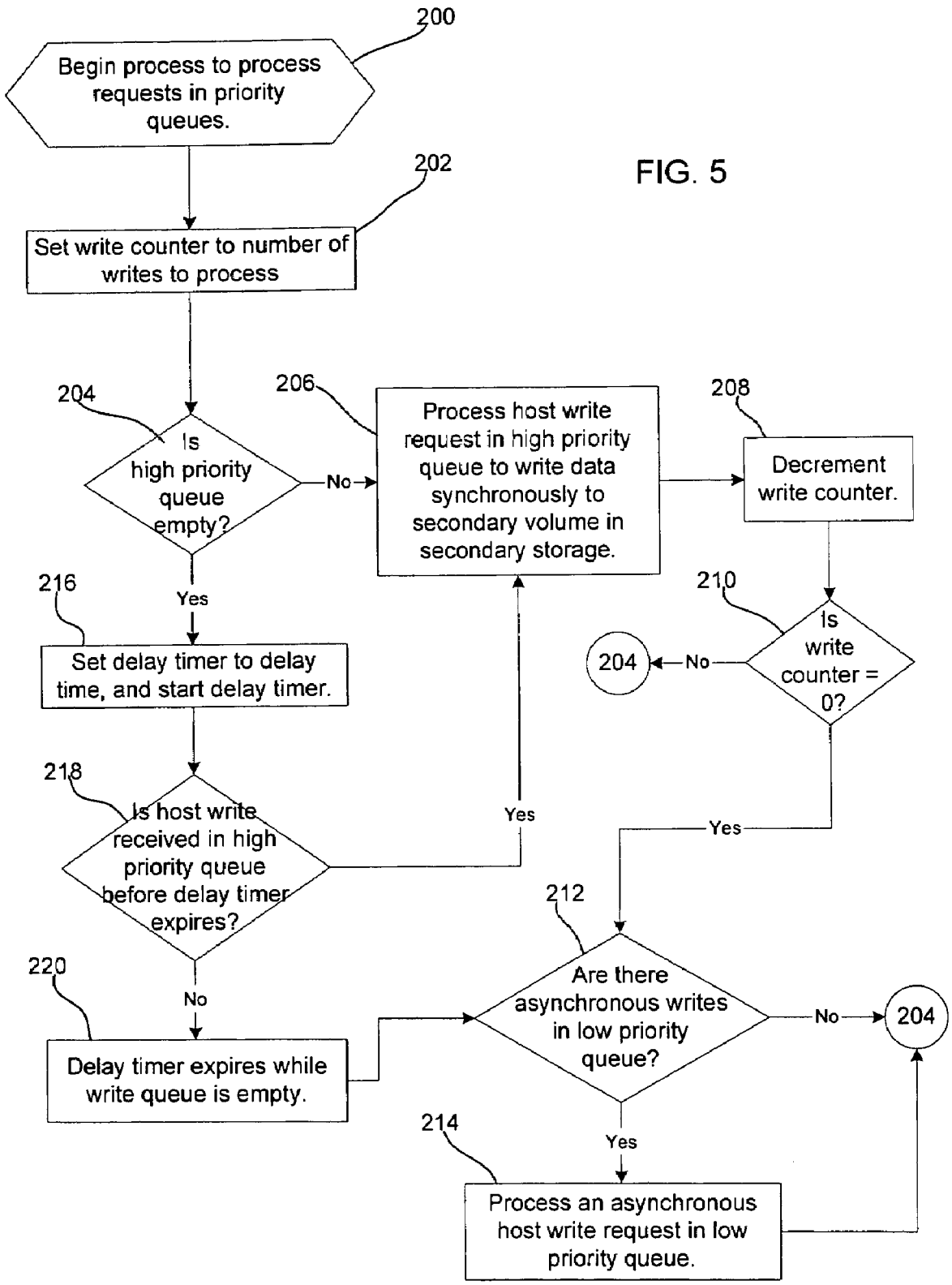

FIGS. 3, 4 and 5 illustrate operations performed by the primary storage manager 22 to handle I/O requests directed to primary volumes 10 and manage any copy relationships. FIG. 3 illustrates operations the primary storage manager 22 performs to establish a copy relationship. When initiating an operation (at block 100) to establish a copy relationship between one or more primary volumes 10 and one or more corresponding secondary volumes 12, as indicated in copy relationship information 42, the primary storage manager 22 adds entries (at block 102) to the low priority queue 28 for the establish chains to copy asynchronously as part of the initial copy operation, where each establish chain comprises a subset of the initial copy operation. The intercept write flag 40 (FIG. 2) is set (at block 104) to "on" to indicate that certain volumes 10 in the primary storage 4 may be subject to a copy relationship 42. The primary storage manager 22 then performs the operations illustrated in FIG. 5 to process pending host write requests to primary volumes 10 subject to a copy relationship.

FIG. 4 illustrates operations the primary storage manager 22 performs to handle a host 2 write request to a primary volume 10. Upon receiving (at block 150) a host 2 write request to a primary volume 10, if (at block 152) the intercept write flag 40 is "on", indicating that certain primary volumes 10 may be subject to a copy relationship 42 (FIG. 2), then a determination is made (at block 154) whether the primary volume is included in an extent of primary volumes 44, i.e., in a copy relationship. If so and if (at block 156) the primary volume has not yet been copied over to the corresponding secondary volume 12 as part of the initial copy operation, then the host write request is queued (at block 158) in the low priority queue 28 to handle asynchronously as described in FIG. 5, and an asynchronous acknowledgment is returned (at block 160) to the host 2 that initiated the write request. Otherwise, if (at block 156) the host write request is to a primary volume 10 that has already copied to the secondary storage 4 as part of the initial copy operation, then the host write request is queued (at block 162) in the high priority queue 30 to process synchronously at a higher relative priority over host write requests in the low priority queue 28 to primary volumes 10 not yet initially copied. If the intercept write flag 40 is "off" (from the no branch of block 152) or the primary volume is not involved in a copy relationship (from the no branch of block 154), then the primary storage manager 22 executes (at block 164) the received host 2 write request against the primary volume 10.

FIG. 5 illustrates operations the primary storage manager 22 performs to process the requests in the priority queues 28 and 30. Upon being invoked (at block 200) to process the priority queues 28 and 30, which may occur at block 106 in FIG. 3, the write counter 48 is set (at block 202) to the number of writes to process 32 (FIG. 1). If (at block 204) the high priority queue 30 is not empty, then the primary storage manager 22 processes (at block 206) a synchronous host write request in the high priority queue 30 to write the data in a host request synchronously to the corresponding secondary volume 12 in the copy relationship. The high priority queue 30 may be processed in any manner known in the art, such as First-In-First-Out (FIFO), priority based, etc. After copying a host write request synchronously to the corresponding secondary volume 12 in the secondary storage 14, the write counter 48 is decremented (at block 208). If (at block 210) the write counter 48 is not zero, i.e., the full number of synchronous writes to process 32 has not been processed, then control proceeds back to block 204 to further process the high priority queue 30 until the number of synchronous writes to process 32 has been processed, which occurs when the write counter 48 is zero. If (at block 210) the write counter 48 is zero and if (at block 212) there are one or more pending asynchronous write operations in the low priority queue 28, then the primary storage manager 22 processes (at block 214) one or more asynchronous write requests in the low priority queue 28 to copy one or more primary track(s) in an establish chain or queued host write requests to a corresponding secondary track(s) in the copy relationship. After processing one or more asynchronous requests in the low priority queue 28 (from block 214) or if the low priority queue 28 is empty (from the no branch of block 212), the primary storage manager 22 proceeds to block 204 to process the high priority queue 30 and any pending synchronous write requests.

If (at block 214) the high priority queue 30 is empty, then the primary storage manager 22 sets (at block 216) the delay timer 50 (FIG. 2) to the delay time 34 (FIG. 1), and starts the delay timer 50. If (at block 218) a host write request is received at the high priority queue 30 to process synchronously before the delay timer 50 expires, then control proceeds to block 206 to process the host write request added to the high priority queue 30. Otherwise, if (at block 220) the delay timer 50 expires while no new host write request is received and added to the write queue 30, then control proceeds to block 212 to process one or more asynchronous writes in the low priority queue 28.

With the described logic, even after the high priority queue 30 empties, the primary storage manager 22 delays the length of the delay time 34 before copying an asynchronous write to the secondary storage 14, which may comprise the write of an establish chain or a host write request to which asynchronous acknowledgment was returned. This allows write requests to be synchronously processed without being continually delayed by the copying of a larger asynchronous write to the secondary volumes 12 in the copy relationship. The described implementations further allow the synchronous writes to be processed without having to wait for link resources that are being used by lower priority asynchronous write requests, such as establish chains or host write requests handled asynchronously, but only with other synchronous writes being transferred, such as writes to primary volumes in a copy relationship that have been copied to the secondary volume 12 as part of the initial copy operation.

In certain implementations, the delay time 34 and number of synchronous writes to process 32 parameters may be set to empirically determined optimal values to increase the speed of processing synchronous host write requests and avoid any undue delays to the host, and at the same time continue with the copying of asynchronous writes to the secondary volumes 12. The delay time 34 and number of writes 32 can be set manually by an administrator or dynamically during operations based on the system performance. For instance, in certain implementations the delay time 34 can be set to a value approximately, but slightly more, than the average time between the arrival of synchronous host write requests to provide sufficient time to likely capture a host write request before proceeding with the copying of the lower priority asynchronous writes to the secondary storage 14. Still further, one may want to set the delay time 34 close to the average arrival time between the synchronous host write requests, but not more than approximately half the average time for an asynchronous write to complete in order to avoid a delay during which an entire asynchronous write could have been completed. Thus, the average time between host write requests and the average time to complete an asynchronous write can be used to determine an optimal delay time 34.

Additional Implementation Details

The data management techniques disclosed herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks,, tape, etc.), optical storage (CD-ROMs, optical disks, etc.), volatile and non-volatile memory devices (e.g., EEPROMs, ROMs, PROMs, PAMs, DRAMs, SRAMs, firmware, programmable logic, etc.). Code in the computer readable medium is accessed and executed by a processor. The code may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In certain implementations, the primary controller 6 handles synchronously host writes to primary volumes already copied over as part of the initial copy operation and handles asynchronously host writes to primary volumes not yet copied to the secondary storage 14 by the initial copy procedure. Further, initial copy operations are handled asynchronously. In alternative implementations, different data transfer modes, asynchronous versus synchronous, may be used to handle host writes and initial copy data than that described herein.

In described implementations, asynchronous host writes and initial copy writes to the secondary storage 12 are queued in the same low priority queue 28. In the low priority queue 28, the asynchronous host writes may be processed after the initial copy writes or between initial copy writes. In alternative implementations, different queues may be used for the asynchronous host writes and initial copy writes.

In the described implementations, the primary volumes and secondary volumes are in different, remote storage systems at different sites 8, 18. In alternative implementations, the primary and secondary volumes may be in the same storage device or system.

The logic of FIGS. 3, 4, and 5 describes specific operations occurring in a particular order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 6:
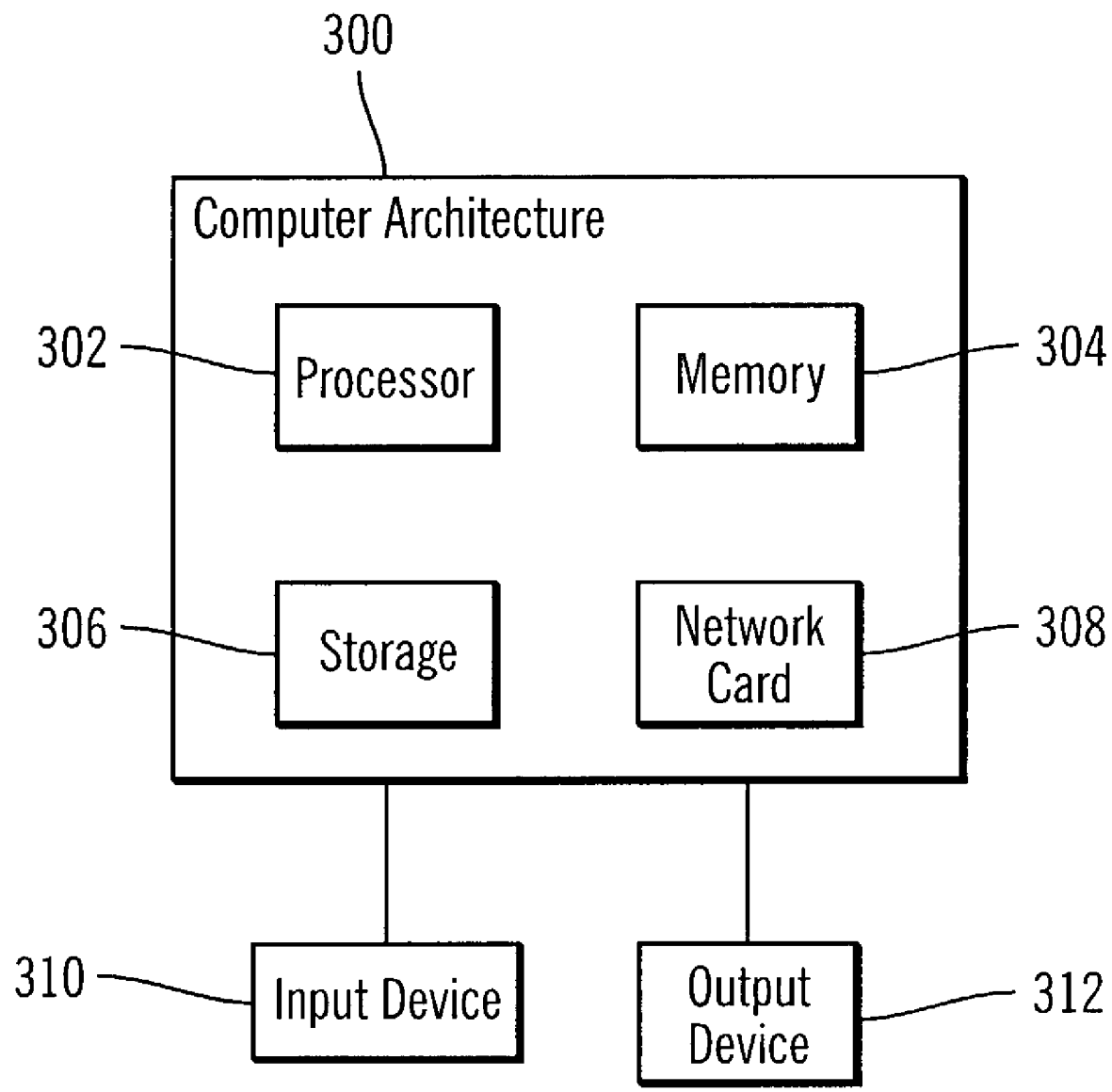
FIG. 6 illustrates a computer architecture that may be used to implement network devices, such as the hosts and primary controllers.

FIG. 6 illustrates one implementation of a computer architecture 300 of the network components and systems shown in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for maintaining a copy relationship between at least one primary volume and at least one corresponding secondary volume, wherein data in the at least one primary volume in the copy relationship is copied to the corresponding at least one secondary volume in the copy relationship, comprising:
generating writes comprising data in the at least one primary volume to copy to the corresponding at least one secondary volume in the copy relationship in a first write mode;
generating writes comprising write requests to the at least one primary volume in the copy relationship to copy to at least one corresponding secondary volume in a second write mode;
transferring a plurality of the writes to the at least one secondary volume in the second write mode before processing at least one write to the secondary volume in the first mode; and delaying processing writes to the at least one secondary volume in the first write mode for a set time period after processing writes to the at least one secondary volume in the second write mode;

receiving a subsequent write to one primary volume in the copy relationship in the second write mode during the set time period; and processing the subsequent write in the second write mode received during the set time period over pending writes to the at least one secondary volume in the first mode.

2. The method of claim 1, wherein the writes in the first write mode include data being copied from the at least one primary volume in the copy relationship to the corresponding at least one secondary volume as part of an initial copy operation to copy all the data in the at least one primary volume in the copy relationship to the at least one corresponding secondary volume.

3. The method of claim 2, wherein the writes in the first write mode further include writes to the at least one primary volume received after initiating the initial copy operation.

4. The method of claim 3, wherein the writes in the first write mode comprising writes to the at least one primary volume received after initiating the initial copy operation comprise writes to at least one primary volume whose data has not yet been copied to the corresponding at least one secondary volume as part of the initial copy operation.

5. The method of claim 2, wherein the writes in the second write mode include writes to the at least one primary volume received after initiating the initial copy operation.

6. The method of claim 5, wherein the writes in the second write mode comprising writes to the at least one primary volume received after initiating the initial copy operation comprise writes to at least one primary volume whose data has been copied to the corresponding at least one secondary volume as part of the initial copy operation.

7. The method of claim 5, wherein the writes in the first write mode include writes to the at least one primary volume received after initiating the initial copy operation to at least one primary volume whose data has not yet been copied to the corresponding at least one secondary volume as part of the initial copy operation.

8. The method of claim 7, wherein the first write mode comprises asynchronous write mode and the second write mode comprises synchronous write mode, further comprising:

returning asynchronous acknowledgment to a host initiating the writes in the first write mode to the at least one primary volume received after initiating the initial copy operation.

9. The method of claim 1, wherein the first write mode comprises an asynchronous write mode and the second write mode comprises a synchronous write mode.

10. The method of claim 9, wherein the writes in the first write mode are stored in a first queue and the writes in the second write mode are stored in a second queue.

11. The method of claim 10, wherein transferring the plurality of writes to the at least one secondary volume in the second queue comprises processing a set fixed number of writes in the second queue before processing one write in the first queue.

12. The method of claim 11, wherein delaying the processing for the set time period occurs whenever the second queue becomes empty while processing the second write queue and before the set fixed number of writes in the second queue are transferred to the at least one corresponding secondary volume.

13. The method of claim 10, further comprising:

transferring at least one write in the first queue to the corresponding at least one secondary volume after transferring the set fixed number of writes from the second queue.

14. The method of claim 1, wherein the copy relationship comprises a peer-to-peer remote copy relationship.

15. The method of claim 1, wherein the set time period is set to a value related to an expected time between writes in the second write mode.

16. The method of claim 15, wherein the set time period value is further set to be not greater than half the time to complete processing one write in the first write mode.

* * * * *